United States Patent
Kikuchi et al.

(10) Patent No.: US 7,344,684 B2
(45) Date of Patent: Mar. 18, 2008

(54) EXHAUST EMISSION PURIFYING CATALYST DEVICE

(75) Inventors: Seiji Kikuchi, Okazaki (JP); Kinichi Iwachido, Aichi (JP); Hiroaki Ohhara, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 623 days.

(21) Appl. No.: 10/901,097

(22) Filed: Jul. 29, 2004

(65) Prior Publication Data

US 2005/0084427 A1  Apr. 21, 2005

(30) Foreign Application Priority Data

| Jul. 30, 2003 | (JP) | ............................ 2003-203580 |
| Jan. 29, 2004 | (JP) | ............................ 2004-021477 |
| Jul. 9, 2004 | (JP) | ............................ 2004-202934 |

(51) Int. Cl.
*B01D 50/00* (2006.01)
*B01D 53/34* (2006.01)

(52) U.S. Cl. ...................................... 422/177; 422/180

(58) Field of Classification Search ........ 422/169–172, 422/177–183, 221, 222; 502/334
See application file for complete search history.

(56) References Cited

U.S. PATENT DOCUMENTS 4,118,199 A * 10/1978 Volker et al. ............... 422/171

6,149,877 A * 11/2000 Ogai ........................ 422/180

FOREIGN PATENT DOCUMENTS

| DE | 19522913 A1 | 1/1996 |
| JP | 11-2114 A | 1/1999 |
| JP | 2000-27677 A | 1/2000 |
| JP | 2001-190960 A | 7/2001 |

* cited by examiner

*Primary Examiner*—Walter D. Griffin
*Assistant Examiner*—Frank C Campanell
(74) *Attorney, Agent, or Firm*—Birch, Stewart, Kolasch & Birch, LLP

(57) ABSTRACT

There is provided an exhaust emission purifying catalyst device which is comprised of a carrier disposed in an exhaust passage and including through holes passed through the carrier in an axial direction (flowing direction), and supporting layers made of fire-resistance inorganic oxide formed on inner surfaces of the through holes. The supporting layers support noble metal and $NO_x$ trapping agents which occlude $NO_x$ in exhaust gas when the exhaust air-fuel ratio is lean, and emits and reduces the occluded $NO_x$ when the exhaust air-fuel ratio is stoichiometric or rich. The amount of the supported noble metal is set to be smaller in an exhaust passage upstream area of the carrier than in an exhaust passage downstream area of the carrier.

6 Claims, 12 Drawing Sheets

| CATALYST | Low PGM | High PGM |
|---|---|---|
| SUPPORTING LAYERS | K main | Ba main |

| CATALYST | Low PGM | High PGM |
|---|---|---|
| SUPPORTING LAYERS | AMOUNT OF $NO_x$ TRAPPING AGENT IS UNIFORM | |

EXHAUST EMISSION PURIFYING CATALYST DEVICE

CROSS-REFERENCE TO RELATED APPLICATIONS

This application incorporates by reference the subject matter of Application No. 2003-203580 filed in Japan on Jul. 30, 2003, No. 2004-21477 filed in Japan on Jan. 29, 2004, and No. 2004-202934 filed in Japan on Jul. 9, 2004, on which a priority claim is based under 35 U.S.C. § 119(a).

BACKGROUND OF THE INVENTION (1) Field of the Invention

The present invention relates to an exhaust emission control apparatus, and more particularly to a $NO_x$ occluding catalyst which purifies $NO_x$ with a high efficiency.

(2) Description of the Related Art

In recent years, a lean burn internal combustion engine which is capable of performing combustion in an oxygen-excess atmosphere (at a lean air-fuel ratio) has been put into practical use so as to improve fuel economy. The lean burn internal combustion engine (lean burn engine) employs a $NO_x$ occluding catalyst which purifies $NO_x$ in exhaust gas by occluding $NO_x$ during lean burn. It has been known that the $NO_x$ occluding catalyst has a function of purifying $NO_x$ in exhaust gas by occluding $NO_x$ onto the catalyst in an oxygen-excess atmosphere (at a lean air-fuel ratio), and emitting the occluded $NO_x$ when the oxygen concentration lowers (at a stoichiometric or rich air-fuel ratio). Specifically, in an oxygen-excess atmosphere, the $NO_x$ occluding catalyst generates nitrate from $NO_x$ in exhaust gas to occlude $NO_x$, and on the other hand, in an oxygen concentration reduced atmosphere, the $NO_x$ occluding catalyst causes the nitrate occluded to the $NO_x$ occluding catalyst and CO in exhaust gas to react with each other to generate carbonate so that $NO_x$ can be emitted.

By the way, the $NO_x$ occluding catalyst occludes $NO_x$ onto the catalyst in an oxygen-excess atmosphere during lean burn, but when the amount of occluded $NO_x$ reaches a saturation amount as a result of continuous lean burn, $NO_x$ in exhaust gas cannot be occluded and emitted into the air. Thus, before the amount of occluded $NO_x$ reaches a saturation amount, the air-fuel ratio of the lean burn engine is switched to a stoichiometric or rich air-fuel ratio to change exhaust gas into an atmosphere having a low oxygen concentration, so that a large amount of reducing agents such as CO and HC are generated to emit and reduce $NO_x$ to restore the $NO_x$ occluding capability of the $NO_x$ occluding catalyst (this is called "$NO_x$ purge").

In this operational range, in the case where $NO_x$ is emitted and reduced with the air-fuel ratio of the lean burn engine being switched to a stoichiometric or rich air-fuel ratio so as to restore the $NO_x$ occluding capability, and part of the supplied reducing agents such as CO and HC is consumed so as to emit the occluded $NO_x$, and the remaining reducing agents are consumed so as to reduce the emitted $NO_x$.

In the $NO_x$ purge, however, if the amount of reducing agents such as CO and HC is small, $NO_x$ occluded to the $NO_x$ occluding catalyst cannot be satisfactorily emitted and reduced, which deteriorates not only the $NO_x$ occluding performance during operation at a lean air-fuel ratio but also the fuel economy due to an increase in the frequency of regeneration. Therefore, if the air-fuel ratio is made considerably richer as compared with a stoichiometric air-fuel ratio so that $NO_x$ occluded to the $NO_x$ occluding catalyst can be satisfactorily emitted and reduced, i.e. the amount of reducing agents such as CO and HC can be sufficient, reducing agents such as CO and HC which are not used for emission and reduction are emitted to an area downstream of the $NO_x$ occluding catalyst.

To address this problem, it is known that a three-way catalyst is disposed downstream of the $NO_x$ occluding catalyst so as to remove $NO_x$, CO, and HC (Patent Publication 1: JP 11-002144 A). An exhaust emission control apparatus disclosed in the Patent Publication 1 is constructed such that a front three-way catalyst, a $NO_x$ catalyst, and a rear three-way catalyst are arranged in cascade in this order.

For example, a direct-injection lean burn engine needs to maintain a high $NO_x$ trapping capability during operation at a lean air-fuel ratio and a high HC and CO purifying capability during operation at a stoichiometric or rich air-fuel ratio. Therefore, as shown in FIG. 12A, an exhaust emission control apparatus employing a tandem system is used in which a $NO_x$ catalyst 100 and a three-way catalyst 110 are arranged in cascade along an exhaust passage.

Also, as shown in FIG. 12B, an exhaust emission control apparatus employing a single system is used in which a single ceramic carrier is disposed along an exhaust passage, and a $NO_x$ catalyst 100' and noble metal 110' are supported on the carrier so as to ensure a $NO_x$ trapping capability and a three-way catalyst capability.

In the exhaust emission control apparatus as shown in FIG. 12A and disclosed in the patent publication 1, the number of catalysts and the catalyst capacity are increased, and this increases exhaust pressure loss and reduces engine power. On the other hand, in the exhaust emission control apparatus constituting the single system as shown in FIG. 12B, although an increase in catalyst capacity and exhaust pressure loss can be suppressed, $NO_x$ trapping agents and noble metal operate in such a manner as to suppress the functions of each other, and hence optimum $NO_x$ trapping performance and three-way catalyst performance cannot be achieved.

Further, in the exhaust emission control apparatus, it can be envisaged that the amount of noble metal supported on the catalyst is increased so as to improve the HC and CO purifying performance and the $NO_x$ purifying performance during operation at a lean air-fuel ratio, but this is encountered with the problem that the $NO_x$ purifying performance is actually degraded. This is assumed to be because a phenomenon described below occurs for the reason that the consumption of reducing agents during operation at a rich air-fuel ratio is increased due to an improvement in oxidizing performance as a result of an increase in the amount of supported noble metal.

Firstly, the amount of reducing agents for $NO_x$ emitted from the $NO_x$ occluding agent is insufficient.

Secondly, when the air-fuel ratio is rich immediately after the air-fuel ratio is switched from a lean air-fuel ratio to a rich air-fuel ratio, it is difficult to restore the activity of noble metal due to oxygen poisoning caused by the shortage of reducing agents (the activity of noble metal is kept degraded).

Thirdly, when the air-fuel ratio is rich, the emission of $NO_x$ occluded to the $NO_x$ trapping agents is suppressed due to the shortage of reducing agents, and hence the $NO_x$ purge cannot be satisfactorily performed.

SUMMARY OF THE INVENTION

It is therefore an object of the present invention to provide an exhaust emission purifying catalyst device which is capable of fulfilling a $NO_x$ trapping function and a three-way catalyst function to improve the exhaust gas purifying efficiency. Also, it is an object of the present invention to provide an exhaust emission purifying catalyst device which is capable of improving the exhaust emission purifying efficiency of a $NO_x$ occluding catalyst having an $O_2$ storage function without deteriorating fuel economy.

To attain the above object, there is provided an exhaust emission purifying catalyst device including a single carrier that is disposed in an exhaust passage and includes a large number of through holes passed through the single carrier in a flowing (axial) direction, and supporting layers made of fire-resistant inorganic oxide and formed on inner surfaces defining the through holes, wherein the supporting layers support noble metal and $NO_x$ trapping agents for occluding $NO_x$ in exhaust gas when the exhaust air-fuel ratio is lean, and emit and reduce the occluded $NO_x$ when the exhaust air-fuel ratio is stoichiometric or rich, and the amount of the noble metal supported on the supporting layers is set to be smaller in an exhaust passage upstream area of the carrier than in an exhaust passage downstream area of the carrier.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein:

FIGS. 2A and 2B are views useful in explaining the construction of the exhaust emission purifying catalyst device for use in the exhaust emission control apparatus in FIG. 1, in which FIG. 2A shows the first embodiment, and FIG. 2B shows a second embodiment;

FIGS. 12A and 12B are views schematically showing the constructions of conventional exhaust emission control apparatuses, in which FIG. 12A shows a first prior art, and FIG. 12B shows a second prior art.

DETAILED DESCRIPTION OF THE INVENTION

First Embodiment

Figure 1:
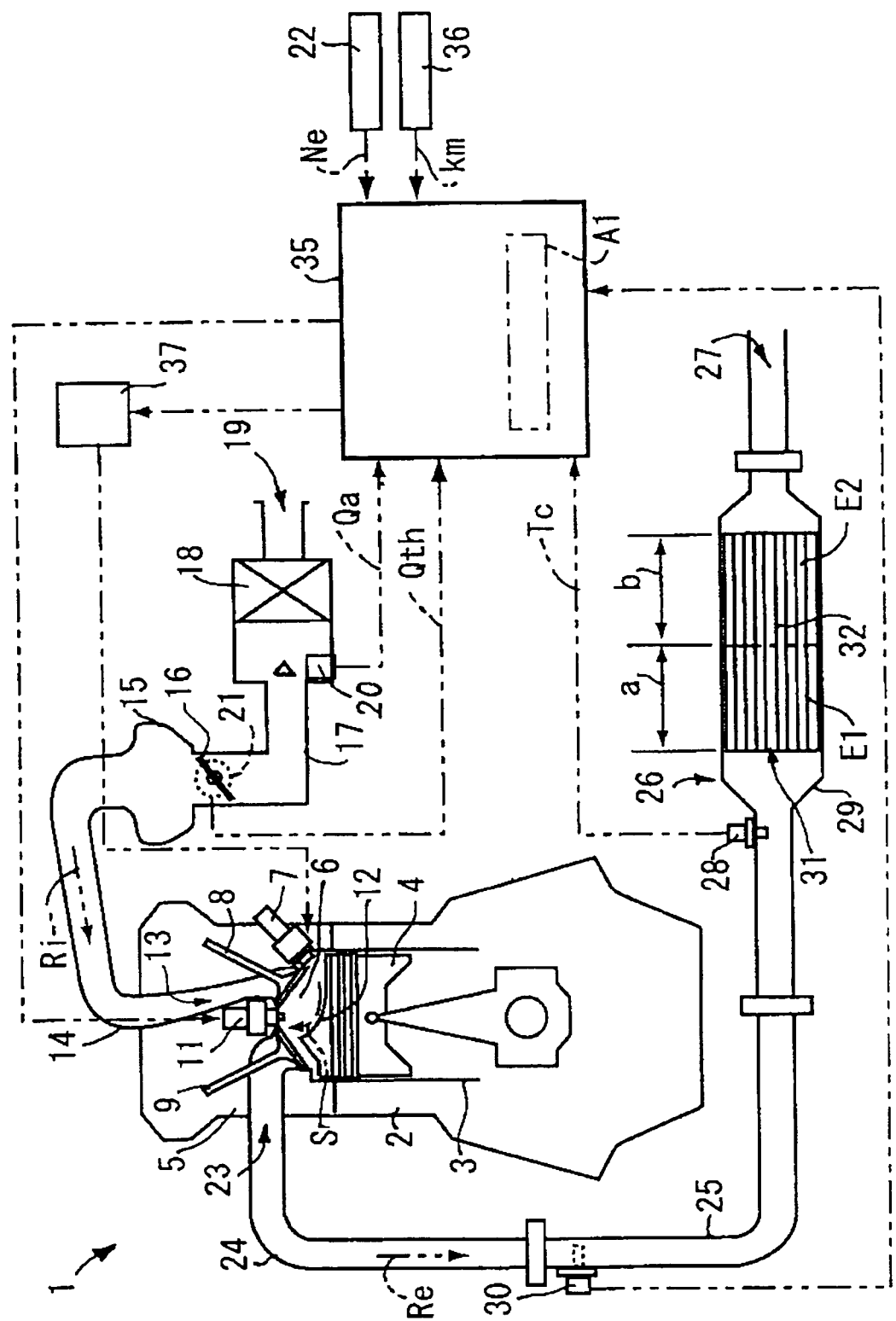
FIG. 1 is a view schematically showing the construction of an exhaust emission control apparatus including an exhaust purifying catalyst device according to a first embodiment of the present invention.

FIG. 1 illustrates an exhaust emission control apparatus according to a first embodiment of the present invention, which is provided with an exhaust emission purifying catalyst 26 disposed in an exhaust system, and an internal combustion engine equipped with the exhaust emission control apparatus. The internal combustion engine is implemented by a four-cycle multiple cylinder gasoline engine (hereinafter referred to only as "the engine 1"). The engine 1 is constructed such that a combustion chamber 6 is enclosed by a cylinder 3 in a cylinder block 2, a piston 4 which slides upward and downward in the cylinder 3, and a cylinder head 5 which integrally overlaps the upper surface of the cylinder block 2. The combustion chamber 6 is provided for each cylinder (only one cylinder is illustrated in FIG. 1). An electromagnetic fuel injection valve 7 is attached to the combustion chamber 6. The fuel injection valve 7 is capable of performing fuel injection in an intake stroke injection mode in which fuel is injected into the combustion chambers 6 in intake strokes, a compression stroke injection mode in which fuel is injected in compression strokes, and an expansion stroke injection mode in which fuel is injected in expansion strokes.

The engine 1 is capable of operating at a stoichiometric air-fuel ratio, a rich-air fuel ratio (rich air-fuel ratio operation), and a lean air fuel ratio (lean air-fuel ratio operation). Particularly in the compression stroke injection mode, the engine 1 is capable of operating at an ultra-lean air-fuel ratio which is higher than in lean air-fuel ratio operation in intake strokes.

The fuel injection valve 7, an intake valve 8, an exhaust valve 9, and an ignition plug 11 are arranged at such respective locations of each combustion chamber 6 as not to interfere with each other.

A cavity 12 which is concaved in a semispherical form is formed at the top of the piston 7 within the cylinder 3. The cavity 12 cooperates with an intake port 13 to generate a reverse tumble flow S in a clockwise direction as viewed in FIG. 1. An intake port is formed in a substantially upright direction for the cylinder head 5 of each cylinder, and an intake manifold 14, a surge tank 15, an intake pipe 17 having a throttle valve 16, an air cleaner 18, and an air-side opening 19, all of which constitute an intake system Ri, are connected in this order to each intake port (only one intake port is illustrated in FIG. 1) 13 so that the air can be taken along the intake system Ri.

The throttle valve 16 is a drive-by-wire (DBW) type electric-operated valve provided with a throttle position sensor 21 which detects the throttle valve opening θth. It should be noted that an air flow sensor 20 which detects the intake air quantity Qa is provided in the vicinity of the air cleaner 18 in the intake system Ri. The engine 1 is provided with a crank angle sensor 22 which detects the crank angle; the crank angle sensor 22 is capable of detecting the engine speed Ne.

The cylinder head 5 of each cylinder is formed with an exhaust port 23 in a substantially horizontal direction. An exhaust manifold 24 forming an exhaust system Re, an exhaust pipe (exhaust passage) 25, the exhaust emission purifying catalyst device 26 constituting the essential part of the exhaust emission control apparatus, a downstream exhaust pipe 27, and a muffler, not shown, all of which constitute an exhaust system Re, are connected in this order to each exhaust port (only one exhaust port is illustrated in FIG. 1) 23 so that exhaust gas can be externally emitted along the exhaust system Re.

In the exhaust pipe 25, a temperature sensor 28 which detects the exhaust temperature is provided just upstream of the exhaust emission purifying catalyst device 26, and an air-fuel ratio sensor 30 which detects the air-fuel ratio is provided upstream of the temperature sensor 28.

Figure 2A:
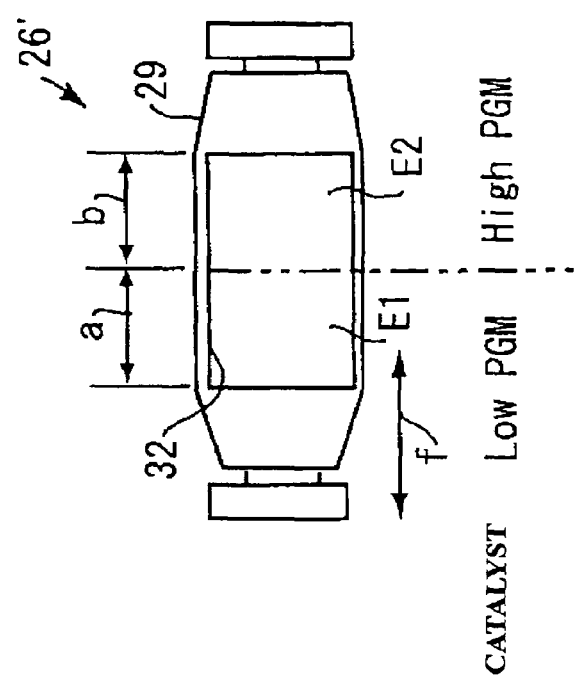
Figure 3:
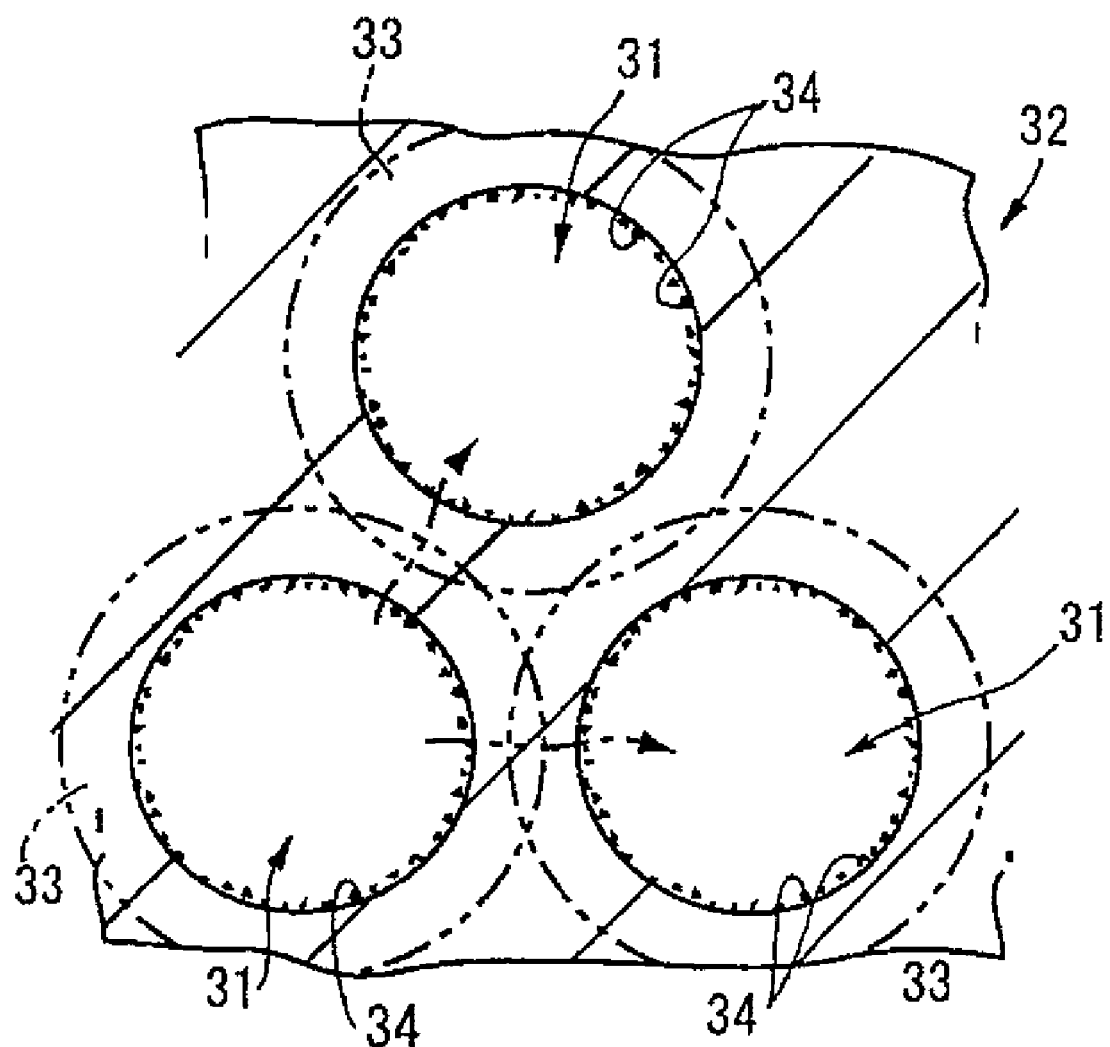
FIG. 3 is a partial enlarged cutaway sectional view showing a carrier for use in the exhaust emission purifying catalyst device appearing in FIG. 1.

As shown in FIGS. 1, 2A, and 3, the exhaust emission purifying catalyst device 26 is comprised of a cylinder-shaped casing 29 whose inner diameter is enlarged so as to be continuous to the exhaust pipe 25 and the downstream exhaust pipe 27, a single carrier 32 disposed in the casing 29 having a large number of through holes 31 (refer to FIG. 3) passed through the carrier 32 in an axial direction, supporting layers 33 (refer to FIG. 3) formed of fire-resistant inorganic oxide formed on inner surfaces which define the respective through holes 31, and catalyst components 34 (refer to FIG. 3) formed of noble metal and supported on the supporting layers 33.

The single carrier 32 is composed mainly of alumina and is formed to have a honeycomb structure including the supporting layers 33 formed on the inner surfaces defining the respective through holes 31.

Here, in particular, the single carrier 32 is divided into two areas in its axial direction, i.e. in the flowing direction f in the exhaust system Re, and the components of the single carrier 32 are separately set in an exhaust passage upstream area a and an exhaust passage downstream area b as described below. Also, the quantities of noble metal supported on the internal supporting layers 33 on the inner surfaces of the respective through holes 31 are separately set in the exhaust passage upstream area a and the exhaust passage downstream area b as below.

The single carrier 32 appearing in FIGS. 1 and 2A is constructed such that alkali metal composed mainly of potassium (K) which exhibits a high $NO_x$ trapping capability at a relatively high temperature is adopted as a $NO_x$ trapping agent for the supporting layers 33 in the exhaust passage upstream area a, and alkali earth metal mainly composed mainly of barium (Ba) considered to give a relatively small adverse effect on the three-way catalyst performance of noble metal is adopted as a $NO_x$ trapping agent for the supporting layers 33 in the exhaust passage downstream area b.

Here, PT (platinum) as noble metal 34 with a high HC and HO oxidizing capability is supported on the supporting layers 33 over the exhaust passage upstream area a and the exhaust passage downstream area b, and the rich purge time Tr, described later, is set to be equal to or smaller than a predetermined value so that the amount of the noble metal 34 supported in the exhaust passage upstream area a can be smaller than the amount of the noble metal 34 supported in the exhaust passage downstream area b for the reason described below. It is assumed here that the amount of the noble metal 34 supported in the exhaust passage upstream area a is set to 3.0 g/L, the amount of the noble metal 34 supported in exhaust passage downstream area b is set to 5.0 g/L, and the rich purge time Tr is set to 3.0 seconds.

A description will now be given of the reason why the amount of the noble metal 34 supported in the exhaust passage upstream area a is set be smaller than the amount of the noble metal 34 supported in the exhaust passage downstream area b.

Figure 7:
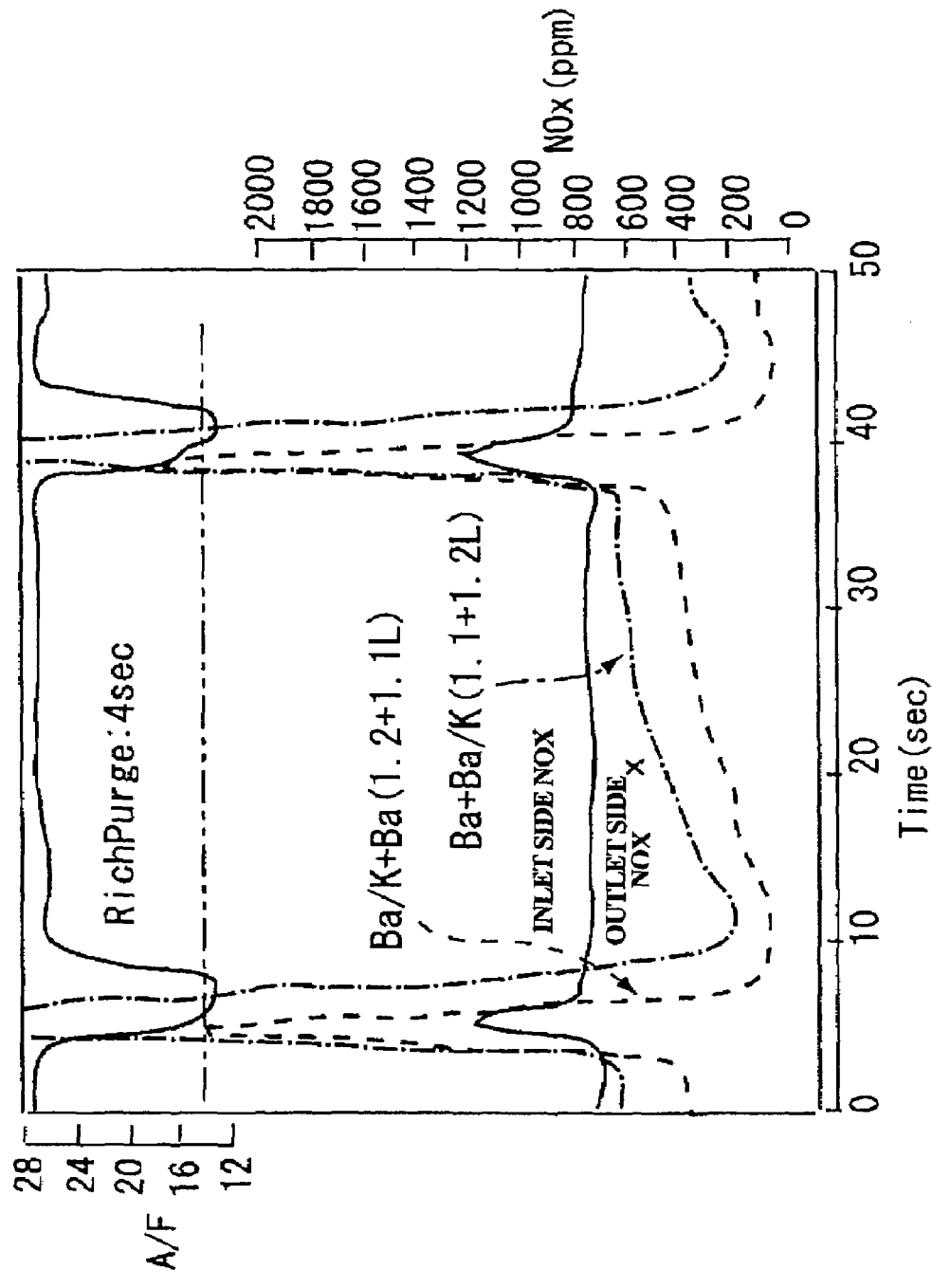
FIG. 7 is a diagram showing the aging characteristics of $NO_x$ concentration and air-fuel ratio during operation in an exhaust emission purifying catalyst device used as reference in setting characteristic values of the exhaust emission control apparatus in FIG. 1.
Figure 8:
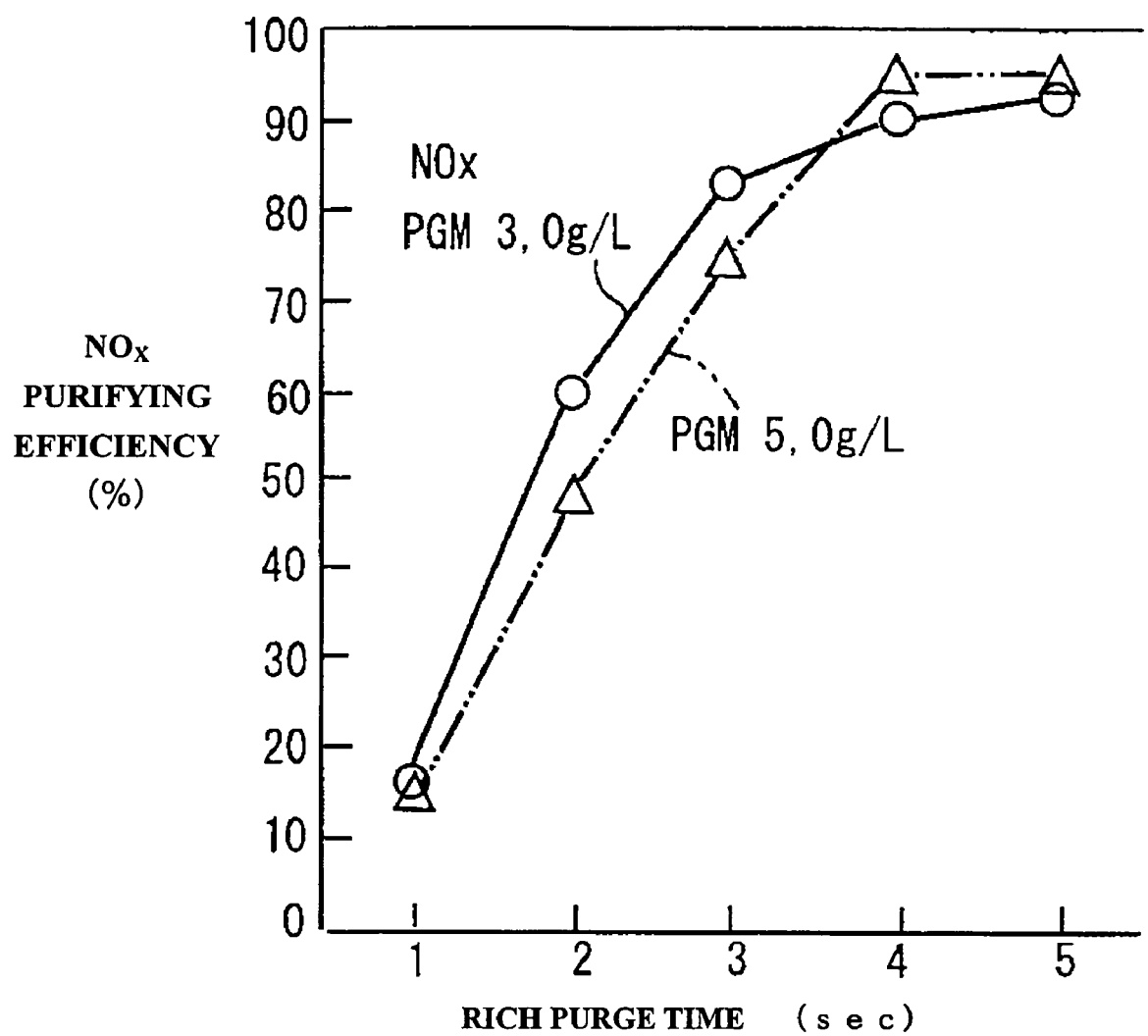
FIG. 8 is a diagram showing the $NO_x$ purifying efficiency characteristics of $NO_x$ concentration and air-fuel ratio in an exhaust emission purifying catalyst device used as reference in setting characteristic values of the exhaust emission control apparatus in FIG. 1.

The inventors of the present invention conducted performance tests on the exhaust emission purifying catalyst 26 using an engine constructed as shown in FIG. 1 and obtained results shown in FIGS. 7 and 8.

In the performance tests, the $NO_x$ purifying efficiency in the case where the supported amount of the noble metal 34 was set to 5.0 g/L in the exhaust passage downstream area b and set to 3.0 g/L in the exhaust passage upstream area a, and in the case where the supported amount of the noble metal 34 was set to 3.0 g/L in the exhaust passage downstream area b and set to 5.0 g/L in the exhaust passage upstream area a was found. As a result, it was proved that when the rich purge time Tr was equal to or shorter than 3.5 seconds, the $NO_x$ purifying efficiency could be kept at a higher level in the case where the supported amount of the noble metal 34 in the exhaust passage upstream area a was as small as 3.0 g/L.

Further, the outlet $NO_x$ concentration (ppm) relative to the inlet $NO_x$ concentration (ppm) in the case where the rich purge time Tr (refer to FIG. 5) was set to 4.0 seconds was found. In this case, the outlet $NO_x$ concentration (ppm) is lower in the case where the supporting layers 33 in the exhaust passage upstream area a were composed of Ba/K (catalyst capacity=1.2 L) and the supporting layers 33 in the exhaust passage downstream area b were composed of Ba (catalyst capacity=1.1 L) than in the case where he supporting layers 33 in the exhaust passage upstream area a were composed of Ba (catalyst capacity=1.1 L) and the supporting layers 33 in the exhaust passage downstream area b were composed of Ba/K (catalyst capacity=1.2 L) (as indicated by a chain line).

As a result, it was proved that the outlet $NO_x$ concentration (ppm) could be lowered more effectively in the case where the supporting layers 33 in the exhaust passage upstream area a are composed mainly of potassium (K) and the supporting layers 33 in the exhaust passage downstream area b are composed mainly of barium (Ba) than in the case where the supporting layers 33 in the exhaust passage upstream area a are composed mainly of barium (Ba) and the supporting layers 33 in the exhaust passage downstream area b are composed mainly of potassium (K). Also, it was proved that if the amount of the noble metal 34 supported in the exhaust passage upstream area a was set to be larger than the amount of the noble metal 34 supported in the exhaust passage downstream area b, the consumption of reducing agents at the initial stage of switching was excessive in the case where the rich purge time Tr was set to 4.0 seconds.

In view of the above characteristics, to improve the $NO_x$ purifying efficiency within a short period of time while reducing the consumption of reducing agents, it is effective that the amount of the noble metal 34 supported in the exhaust passage upstream area a is set to be smaller than in the exhaust passage downstream area b, and the supporting layers 33 in the exhaust passage upstream area a are composed mainly of alkali metal such as potassium.

It should be noted that although platinum (Pt) is used as the noble metal 34 supported on the supporting layers 33, at least one selected from metals of the platinum family such as palladium and rhodium may be used instead of platinum (Pt). In this case, the same functions can be fulfilled as in the case where platinum (Pt) is used. Also, if potassium is disposed on the upstream supporting layers, the $NO_x$ occluding performance can be achieved up to a higher temperature as compared with barium.

As described above, the carrier 32 of the exhaust emission purifying catalyst device 26 appearing in FIGS. 1 and 2A is constructed such that the supporting layers 33 in the exhaust passage upstream area a are formed of alkali metal composed mainly of potassium (K), and a relatively small amount of platinum (Pt) is supported on the supporting layers 33, so that the supporting layers 33 in the exhaust passage upstream area a can serve as a $NO_x$ catalyst section E1 which mainly exhibits an improved $NO_x$ trapping capability. Also, the supporting layers 33 in the exhaust passage downstream area b are formed of alkali metal mainly composed of barium (Ba) considered to give a small adverse effect on the three-way catalyst performance of noble metal, and a relatively large amount of platinum (Pt) is supported on the supporting layers 33, so that the supporting layers 33 in the exhaust passage upstream area a can serve as a three-way catalyst section E2 which mainly fulfills a three-way function.

The $NO_x$ catalyst section E1 upstream in the exhaust emission purifying catalyst device 26 has a $NO_x$ emitting and reducing function of temporarily occluding $NO_x$ in an oxygen-excess atmosphere in which the air-fuel ratio of exhaust gas is lean, and emitting the occluded $NO_x$ when the air-fuel ratio of exhaust gas is stoichiometric or rich, i.e., in a reducing atmosphere in which HC and CO exist, so that the occluded $NO_x$ can be reduced to nitrogen (N2) and carbon dioxide (CO2).

The downstream three-way catalyst section E2 has a three-way catalyst function of purifying CO, HC, and $NO_x$ in exhaust gas in an atmosphere in which the air-fuel ratio of exhaust gas is stoichiometric or rich. It should be noted that the three-way catalyst section E2 also has a function of reducing $NO_x$ which has been emitted from the $NO_x$ catalyst section E1 but has not been sufficiently reduced by the $NO_x$ catalyst section E1. Further, since barium which is considered to give a relatively small adverse effect on the three-way catalyst performance of noble metal is supported on the downstream side of the carrier 32, the three-way function can be fulfilled in an efficient manner.

A vehicle is equipped with a controller (hereinafter referred to only as "the ECU 35") as an engine control means. The ECU 35 is provided with an input/output device, a storage device which stores control programs, control maps, and so forth, a central processing unit, a timer, and a counter, and so forth. The ECU 35 controls the exhaust emission purifying catalyst device 26 as well as the engine 1. The information detected by various sensors is input to the ECU 35. The ECU 35 determines the fuel injection mode, the fuel injection quantity, the ignition timing, and so forth, and provides control to drive the fuel injection valves 7 and the ignition plugs 11.

In a steady operational range, the engine 1 injects fuel in or after the medium stage of a compression stroke and collects a small amount of fuel only in the vicinity of the ignition plugs 11 so that the air-fuel ratio of exhaust gas can be stoichiometric or rich only in the vicinity of the ignition plugs 11. This suppresses the consumption of fuel while realizing stable stratified combustion (stratified ultra-lean combustion). Also, to obtain high power, fuel is injected from the fuel injection valves 7 in intake strokes and uniformly distributed to the entire combustion chambers 6 so that pre-mixture combustion can be performed with the exhaust air-fuel ratio in the combustion chambers 6 being stoichiometric (about 15) or lean.

In fuel supply control provided by the ECU 35, the target cylinder inner pressure corresponding to engine load, i.e., the target mean effective pressure Pe is found from the throttle valve opening θth detected by the throttle position sensor 21 (or the operated amount of an accel pedal sensor, not shown) and the engine speed Ne detected by the crank angle sensor 22. Also, in the fuel supply control, a fuel injection mode is set according to the target mean effective pressure Pe and the engine speed Ne with reference to a map, not shown.

Figure 5:
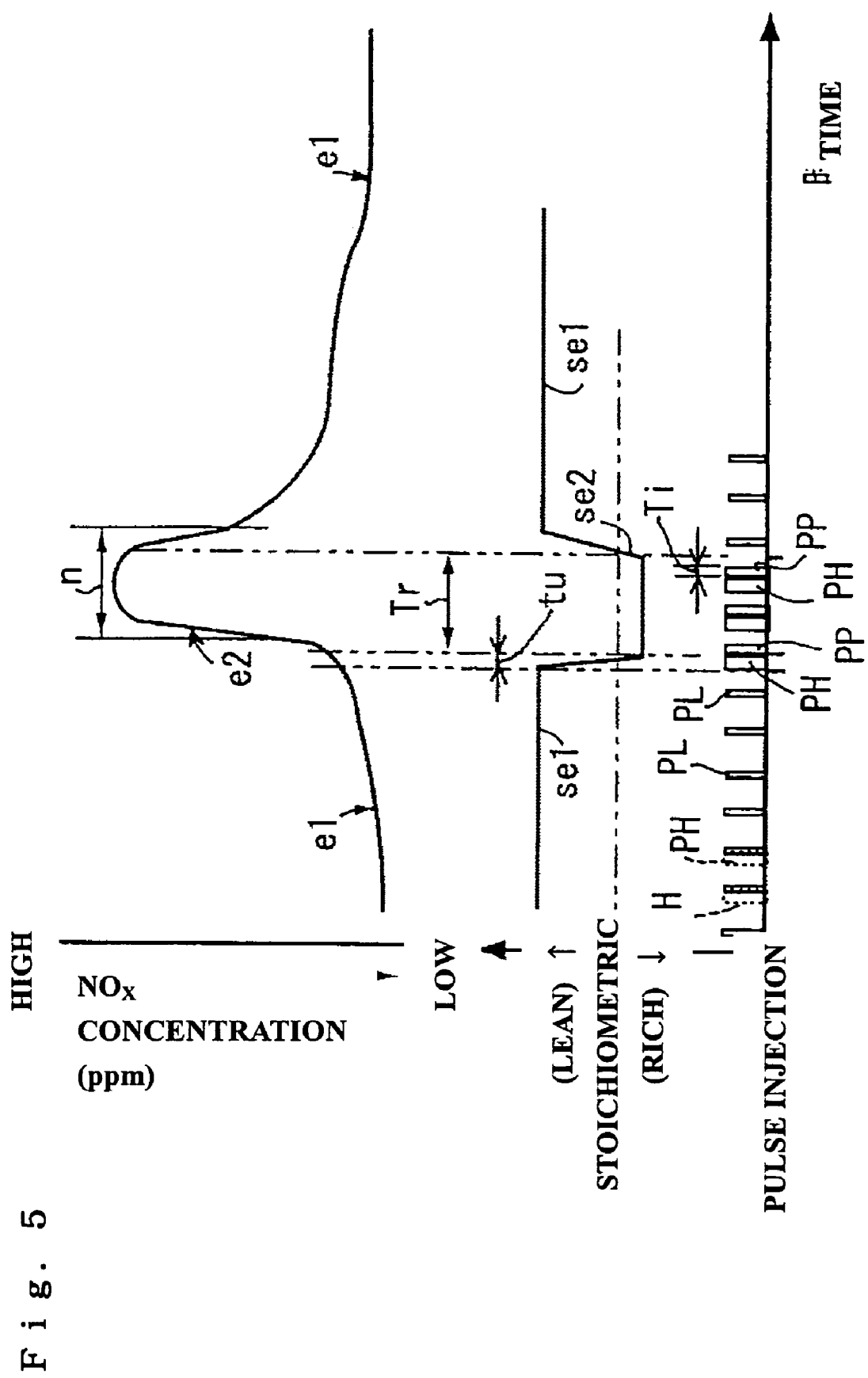
FIG. 5 is a view useful in explaining the $NO_x$ concentration, air-fuel ratio, and pulse injection mode when the exhaust emission control apparatus in FIG. 1 is operative.
Figure 6:
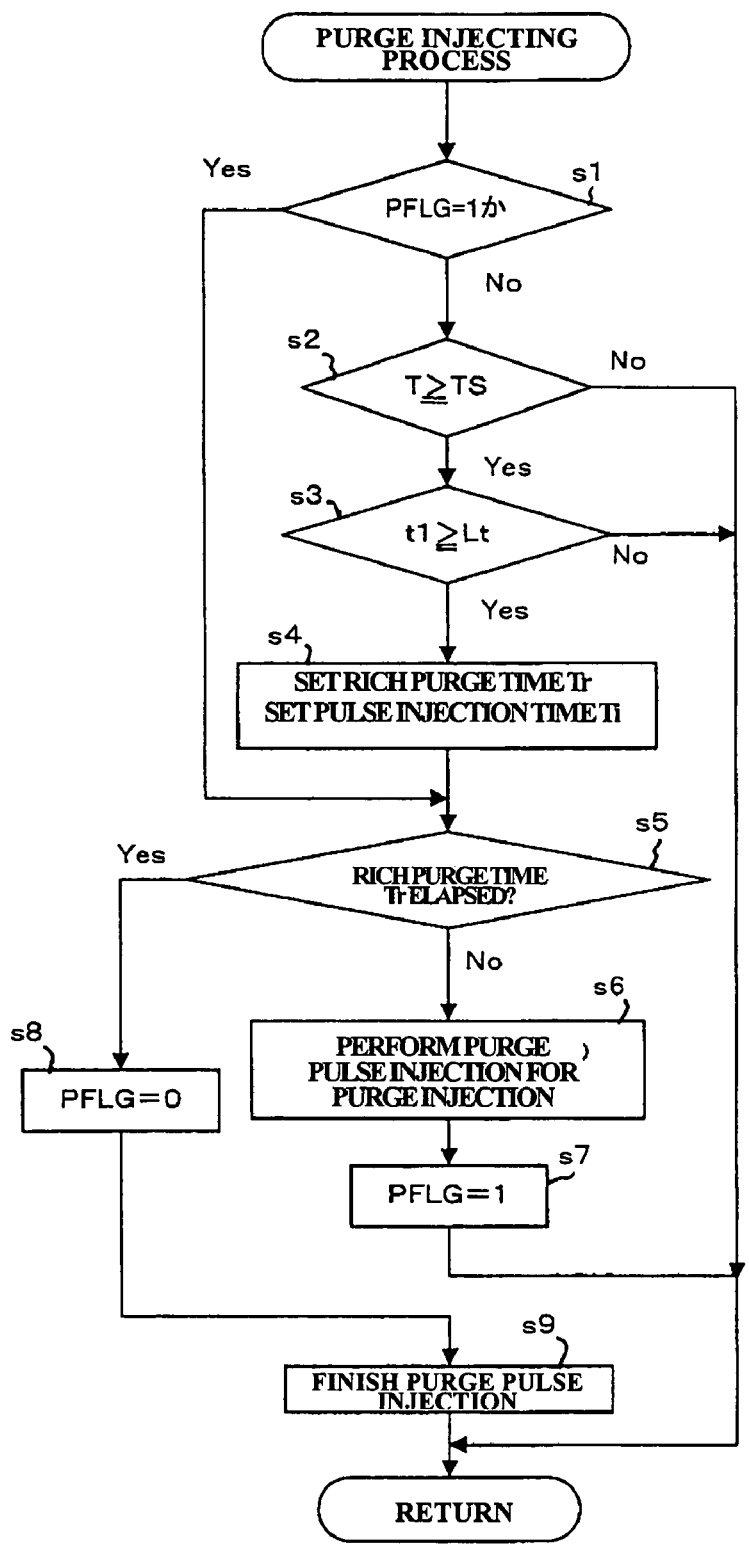
FIG. 6 is a flow chart showing a purge injection processing routine executed by the exhaust emission control apparatus in FIG. 1.

For example, when both the target mean effective pressure Pe and the engine speed Ne are low, the fuel injection mode is set to the compression stroke injection mode in which fuel is injected in compression strokes (as indicated by PL in FIG. 5). On the other hand, when the target mean effective pressure Pe or the engine speed Ne is high, the fuel injection mode is set to the intake stroke injection mode in which fuel is injected in intake strokes (as indicated by PH in FIG. 5). Then, the target air-fuel ratio as a control objective in each fuel injection mode is set according to the target mean effective pressure Pe and the engine speed Ne, and a proper fuel injection volume is determined according to the target air-fuel ratio.

The $NO_x$ catalyst section E1 of the exhaust emission purifying catalyst device 26 purifies exhaust emission by occluding $NO_x$ in exhaust gas as nitrate when the air-fuel ratio of exhaust gas is lean. On the other hand, when the air-fuel ratio of exhaust gas is stoichiometric or rich, the nitrate occluded to the $NO_x$ catalyst section E1 and CO in exhaust gas react with each other to generate carbonate and emit $NO_x$. Therefore, when the amount of $NO_x$ occluded to the $NO_x$ catalyst section E1 increases, such control is provided as to make the air-fuel ratio rich (rich purge). As a result, the concentration of oxygen in exhaust gas is lowered, HC and CO are supplied to the $NO_x$ catalyst section E1, and $NO_x$ is emitted from the $NO_x$ catalyst section E1 and reduced to maintain the $NO_x$ occluding function.

Therefore, the ECU 35 does not only provides the above described fuel supply control, but also functions as a $NO_x$ emitting means A1 for lowering the concentration of oxygen in exhaust gas to emit $NO_x$ from the $NO_x$ catalyst section E1.

Figure 4:
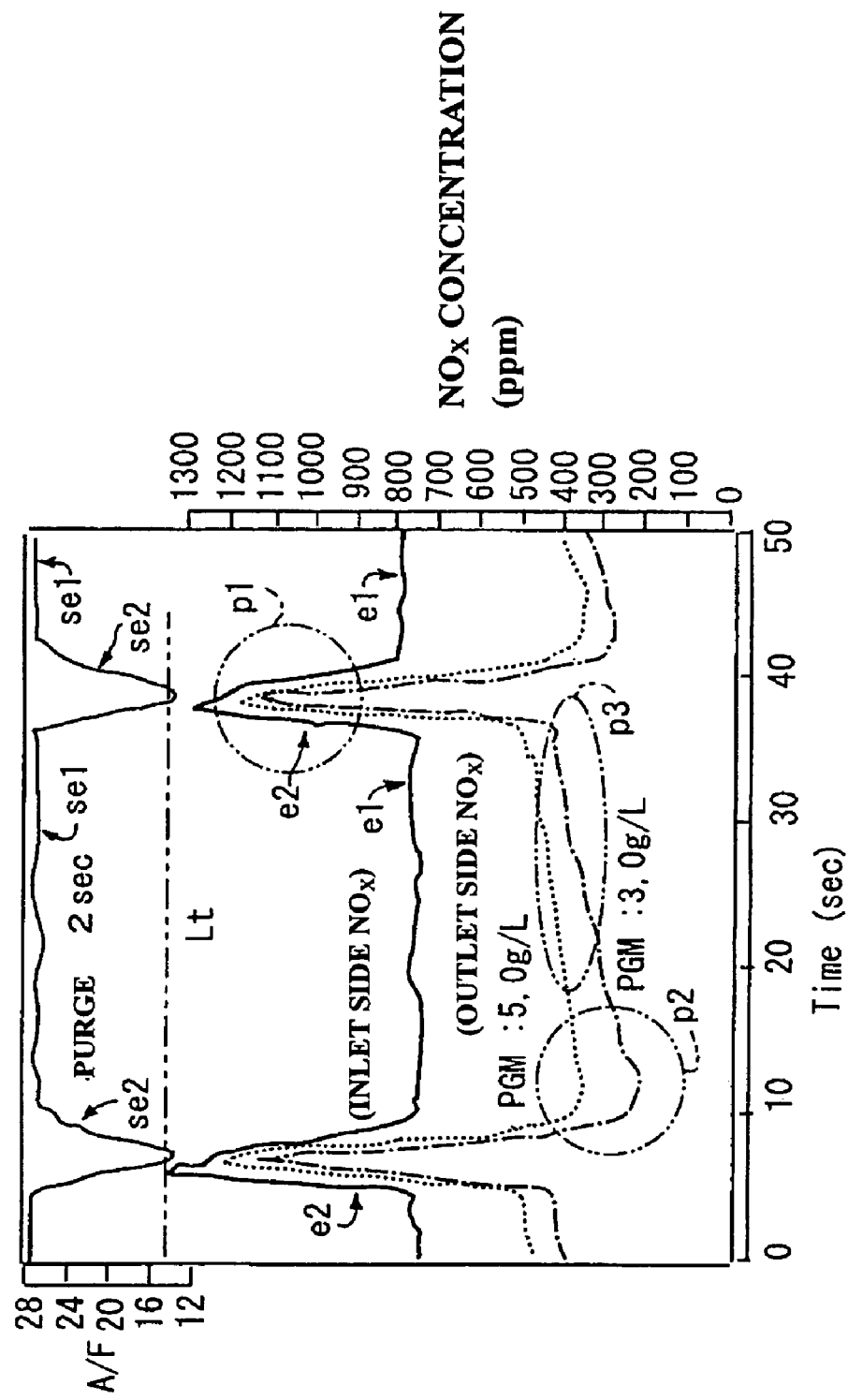
FIG. 4 is a diagram showing the aging characteristics of $NO_x$ concentration and air-fuel ratio when the exhaust emission control apparatus in FIG. 1 is operative.

The $NO_x$ emitting means A1 has a rich purging function of making the exhaust air-fuel ratio rich in the rich purge time Tr (e.g., 2 seconds), and then making the exhaust air-fuel ratio rich again in the lean duration Lt (refer to FIG. 4; e.g., 30 seconds) in accordance with a rich purge instruction for emitting $NO_x$ from the $NO_x$ catalyst section E1.

A description will now be given of the operation of the above described exhaust emission control apparatus.

When the air-fuel ratio of exhaust gas is a lean air-fuel ratio e1 (an oxygen-excess atmosphere; refer to FIGS. 4 and 5), the $NO_x$ catalyst section E1 of the exhaust emission purifying catalyst device 26 oxidizes $NO_x$ in exhaust gas to generate nitrate, so that $NO_x$ is occluded to purify exhaust emission. On the other hand, when the air-fuel ratio of exhaust gas is a stoichiometric or rich air-fuel ratio e2 (an atmosphere in which the oxygen concentration has been reduced; refer to FIGS. 4 and 5), the $NO_x$ catalyst section E1 causes the occluded nitrate and HC and CO in exhaust gas to react with each other to generate carbonate, so that $NO_x$ is emitted.

Therefore, as the occlusion of $NO_x$ to the $NO_x$ catalyst section E1 proceeds, and for example, when the accumulated time of lean air-fuel ratio operation exceeds the lean duration Lt (e.g. 30 seconds), a regenerating instruction is sent to the $NO_x$ emitting means A1, so that the $NO_x$ emitting means A1 controls the air-fuel ratio to a stoichiometric or rich air-fuel ratio to lower the oxygen concentration and emits $NO_x$ from the $NO_x$ catalyst section E1 to carry out a $NO_x$ purging process (regenerating process).

The ECU 35 drives the fuel injection valves 7 via a fuel injection driving circuit 37. The fuel injection driving circuit 37 drives the fuel injection valves 7 in, e.g., lean pulse injection PL, stoichiometric and rich pulse injection PH, and purge pulse injection PP (refer to FIG. 5). Due to such differences in injection patterns, exhaust gas processing characteristics in the exhaust emission purifying catalyst device 26 varies after combustion. When the lean pulse injection PL is performed, $NO_x$ in exhaust gas is occluded by the $NO_x$ catalyst section E1. It should be noted that when the stoichiometric and rich pulse injection PH is performed (during $NO_x$ purge), the lack of reducing agents for $NO_x$ emitted from the $NO_x$ catalyst section E1 can be compensated for by performing the purge pulse injection PP as well.

Here, if the lean pulse injection PL is performed, the $NO_x$ catalyst section E1 causes the supporting layers 33 to occlude $NO_x$ so as to purify $NO_x$. Further, in the case where the rich pulse injection PH is performed, when the air-fuel ratio of exhaust gas reaches an approximately stoichiometric air-fuel ratio, the amount of reducing agents such as HC and CO starts increasing in exhaust gas, but at this time point, the $NO_x$ catalyst section E1 in front of the three-way catalyst section E2 cannot sufficiently reduce $NO_x$ emitted from the $NO_x$ catalyst section E1 since the amount of reducing agents (such as the remaining CO and HC) is not enough to reduce $NO_x$ emitted from the $NO_x$ catalyst section E1 and hence the amount of emitted $NO_x$ is larger than the amount of $NO_x$ to be reduced.

On the other hand, when the accumulated time of lean air-fuel ratio operation exceeds the lean duration L, the $NO_x$ emitting means 32 gives an instruction for performing the rich pulse injection PH in which the target air-fuel ratio is a rich air-fuel ratio, and at least when the air-fuel ratio of exhaust gas is switched to an approximately stoichiometric air-fuel ratio, the $NO_x$ emitting means 32 gives an instruction for performing the purge pulse injection PP in expansion strokes to supply reducing agents to make up for a deficiency of reducing agents in $NO_x$ reduction. In this case, the fuel injection driving circuit 37 sets a counter therein so as to drive the fuel injection valves 7 in the purge pulse injection PP (refer to FIG. 5) as well as the rich pulse injection PH.

As described above, by performing the purge pulse injection PP in expansion strokes, unburned HC (reducing agent) which does not contribute to combustion is emitted from the combustion chambers into the exhaust system Re to serve as HC and CO reducing agents, and in particular, when the air-fuel ratio of exhaust gas is switched to an approximately stoichiometric air-fuel ratio, it is possible to supply a sufficient amount of reducing agents for a rapid increase in $NO_x$ emitted from the $NO_x$ catalyst section E1 (refer to the $NO_x$ concentration in FIG. 5). It should be noted that the three-way catalyst section E2 on which a relatively large amount of noble metal 34 is supported and which does not inhibit the three-way catalyst performance can purify CO and HC as well as $NO_x$ which is emitted from the $NO_x$ catalyst section E1 and cannot be sufficiently reduced. Therefore, it is possible to suppress the emission of $NO_x$, CO and HC into the air, and $NO_x$ emitted form the $NO_x$ catalyst section E1 can be prevented from being directly emitted into the air.

As a result, when the air-fuel ratio is switched to a rich air-fuel ratio during the execution of $NO_x$ purge, the consumption of reducing agents by the noble metal 34 in the exhaust passage upstream area a can be suppressed, and the remaining reducing agents can positively reduce $NO_x$ emitted from the $NO_x$ catalyst section E1. This improves the $NO_x$ purifying efficiency and makes the rich purge time shorter. Further, since the total amount of the noble metal 34 in the exhaust passage upstream area a can be reduced, reducing agents remaining during rich purge can prevent the activity of the noble metal 34 from being degraded due to oxygen poisoning in the exhaust passage downstream area b as well as the exhaust passage upstream area a.

Further, reducing the supported amount of the noble metal 34 can minimize the effect of the consumption of reducing agents by the noble metal 34 during rich purge, and makes it possible to satisfactorily emit $NO_x$ from the $NO_x$ catalyst section E1 and reduce $NO_x$. Therefore, the $NO_x$ absorbing function of the $NO_x$ trapping agents can be fulfilled during lean air-fuel ratio operation.

A description will now be given of $NO_x$ purge control as the above described $NO_x$ emission and reduction control.

The $NO_x$ purge control is provided in the middle of the fuel supply control in a main routine, not shown, executed by the ECU 35.

It should be noted that in the fuel supply control in the main routine, not shown, the fuel injection driving circuit 37 counts the fuel injection timing and the fuel injection time using a counter, not shown, in accordance with an injection pattern designated by the ECU 35, and causes the fuel injection valves 7 to inject fuel. For example, if the target air-fuel ratio is set to a lean air-fuel ratio (as indicated by Se1 in FIGS. 4 and 5), an instruction for performing lean air-fuel ratio operation is given, and the fuel injection driving circuit 37 drives the fuel injection valves 7 in the lean pulse injection PL in FIGS. 4 and 5. Further, if the target air-fuel ratio is switched from the lean air-fuel ratio to a stoichiometric or rich air-fuel ratio, the fuel injection driving circuit 37 drives the fuel injection valves 7 in the rich pulse injection PH in FIG. 5.

On the other hand, at the beginning of the $NO_x$ purge control, a purge flag PFLG, described later, is "0" and the process proceeds to step S2, and if the PFLG is 1, the process proceeds to step S5. In step S2, it is determined whether or not the temperature T of the $NO_x$ catalyst section E1 and the three-way catalyst section E2 has become equal to or higher than an activation temperature Ts (this is estimated according to the exhaust temperature detected by the temperature sensor 28), and if it is determined that the temperature T of the $NO_x$ catalyst section E1 and the three-way catalyst section E2 is equal to or higher than the activation temperature T2, it is then determined in step S3 whether or not the duration t1 of a lean mode is equal to or higher than the lean duration Lt.

It should be noted that the lean duration Lt is determined such that the following requirements (1) to (3) are satisfied:

(1) it is preferred that the lean duration Lt is equal to or shorter than a period of time which is elapsed until it becomes impossible to occlude $NO_x$ to the $NO_x$ catalyst section E1 during lean air-fuel ratio operation and the emission of $NO_x$ into the air starts;

(2) it is preferred that the lean duration Lt is equal to or smaller than a predetermined value since the catalyst temperature lowers if the lean air-fuel ratio operation continues for a long period of time; and (3) it is preferred that the lean duration Lt is equal to or smaller than a predetermined value so as to prevent the $NO_x$ purge unnecessary time tu (refer to FIG. 5), which is required for the air-fuel ratio to switch from a lean air-fuel ratio to a stoichiometric air-fuel ratio at the start of $NO_x$ purge, from increasing to deteriorate fuel economy.

It is assumed here that the optimum lean duration Lt is set to 30 seconds under the above three conditions.

If the determination result is positive (YES) in step S3, this means that conditions for starting providing control to emit the occluded $NO_x$ from the $NO_x$ reducing catalyst E1 and reducing the same are satisfied, the process proceeds to step S4 wherein the rich purge time Tr for which the purge pulse injection PP is performed and the pulse injection time Ti for which the purge pulse injection PP is performed are set in step S4.

The rich purge time Tr is set according to the product of a map value based on the exhaust flow rate such as the intake air volume Qa detected by the air flow sensor 20 and a map value based on the degree of deterioration of the $NO_x$ catalyst section E1 such as the travel distance Km (detected by an accumulated distance detecting device 36). The rich purge time Tr is set to about 1 to 5 seconds, for example, and is set to become shorter with a decrease in an area n where the $NO_x$ emission speed is high as shown in the diagram of FIG. 5 showing the $NO_x$ emission characteristics becomes smaller as the travel distance increases. This suppresses the deterioration of fuel economy and the emission of unburned HC and CO.

The pulse injection time Ti is set to about 0.1 to 1 second, for example, and is set to be decreased to about ½ as the travel distance i.e. the degree of deterioration increases. The reason why the pulse injection time Ti is decreased is that if the degree of deterioration of the $NO_x$ catalyst 15 increases, the $NO_x$ emission characteristics vary such that the area n where the $NO_x$ emission speed is high (refer to FIG. 5) becomes smaller, and hence only a small amount of reducing agents suffices. Since the pulse injection time Ti is set to be short, the deterioration of fuel economy and the emission of unburned HC can be suppressed.

After the rich purge time Tr and the pulse injection time Ti are set and counting is started in step S4, it is determined in step S5 whether the rich purge time Tr has elapsed or not. If the rich purge time Tr has not elapsed, the process proceeds to step S6 wherein an instruction for performing the purge pulse injection PP for the pulse injection time Ti is given.

As a result, the fuel injection driving circuit 37 drives the fuel injection valves 7 in such a pattern that the purge pulse injection PP is performed immediately after the rich pulse injection (refer to the pulse injection volume in FIG. 5). It should be noted that the purge pulse injection PP is performed at least when the air-fuel ratio of exhaust gas is switched from a lean air-fuel ratio to an approximately stoichiometric air-fuel ratio so that the emitted $NO_x$ can be effectively reduced.

Specifically, it is preferred that the purge pulse injection PP after the rich pulse injection PH is performed in the medium stage of an expansion stroke to the initial stage of an expansion stroke, and more particularly in the later stage of an expansion stroke. The addition of fuel in the later stage of an expansion stroke supplies unburned fuel (reducing agent) which has not been combusted into exhaust passages (refer to the $NO_x$ concentration in FIG. 4), and in particular, when the air-fuel ratio of exhaust gas is switched to a stoichiometric air-fuel ratio, a rapidly increasing amount of $NO_x$ absorbed to the $NO_x$ catalyst section E1 is emitted (refer to the $NO_x$ concentration in FIGS. 4 and 5), but the emitted $NO_x$ can be effectively reduced.

After the pulse injection is performed in step S6, the purge flag PFLG is set to "1" in step S7 to terminate the present control, and the process returns to the main routine. It is determined again whether the purge flag PFLG is set to 1 or not. If the determination result is positive, the process proceeds to step S5. If the rich purge time Tr has not elapsed yet, steps S5, S6, and S7 are executed again to sequentially perform the rich pulse injection PH and the purge pulse injection PP, so that $NO_x$ is emitted from the $NO_x$ catalyst section E1 and reduced.

After the lapse of the rich purge time Tr, the purge flag PFLG is set again to "0" in step S8, and the rich pulse injection PH and the purge pulse injection PP are terminated in step S9. The process then returns to the main routine. As a result, fuel injection is performed by providing fuel injection control in the main routine of the ECU 35.

As stated above, since the exhaust passage upstream area a of the single carrier 32 functions as the $NO_x$ catalyst section E1, and the exhaust passage downstream area b of the single carrier 32 functions as the three-way catalyst section E2, engine power is never decreased due to an increase in exhaust pressure loss.

Moreover, since the supported amount of noble metal 34 is set to 3.0 g/L in the exhaust passage upstream area a and is set to 5.0 g/l in the exhaust passage downstream area b, the consumption of HC and CO (reducing agents) by platinum Pt (noble metal) in the exhaust passage upstream area a is suppressed, so that the remaining reducing agents can positively reduce $NO_x$ emitted from the $NO_x$ catalyst section E1 to improve the $NO_x$ purifying efficiency. Namely, the outlet side $NO_x$ indicated by a chain line in FIG. 4 can be smaller than the inlet side $NO_x$ indicated by a solid line in FIG. 4, and the rich purge time can be relatively short. Therefore, the fuel injection volume is reduced.

As described above, in the single exhaust emission purifying catalyst device disposed on the exhaust passage, the amount of noble metal is set to be smaller in the exhaust passage upstream area than in the exhaust passage downstream area, and alkali metal composed mainly of potassium (K) which maintains the $NO_x$ occluding capability up to a relatively high temperature is supported in the exhaust passage upstream area of the carrier, so that the exhaust passage upstream area of the carrier functions as the $NO_x$ catalyst section which exhibits an improved $NO_x$ trapping catalyst function. Further, alkali earth metal composed mainly of barium (Ba) considered to give a relatively small adverse effect on the three-way catalyst performance of noble metal is supported in the exhaust passage downstream area of the carrier, and the amount of noble metal is set to be larger in the exhaust passage downstream area than in the exhaust passage upstream area, so that the exhaust passage downstream area of the carrier functions as the three-way catalyst section.

Therefore, the $NO_x$ catalyst section E1 on the upstream side occludes $NO_x$ during lean air-fuel ratio operation and emits and reduces the occluded $NO_x$ during rich air-fuel ratio operation (or during $NO_x$ purge). Further, during lean air-fuel ratio operation, in the exhaust passage upstream area, the consumption of supplied reducing agents is suppressed due to the presence of potassium considered relatively likely to give an adverse effect on the activity of noble metal, and thus the remaining reducing agents can positively reduce the emitted $NO_x$. Also, the three-way catalyst section E2 on the downstream side functions as a $NO_x$ occluding catalyst due to the presence of barium during lean air-fuel ratio operation, and the consumption of reducing agents is suppressed on the upstream side during $NO_x$ purge in rich air-fuel ratio operation, so that a larger amount of reducing agents can be supplied within a short period of time to immediately make the exhaust atmosphere rich, so that $NO_x$ which is emitted from the $NO_x$ catalyst section E1 and has not been satisfactorily reduced can be efficiently purified.

Second Embodiment

Figure 2B:
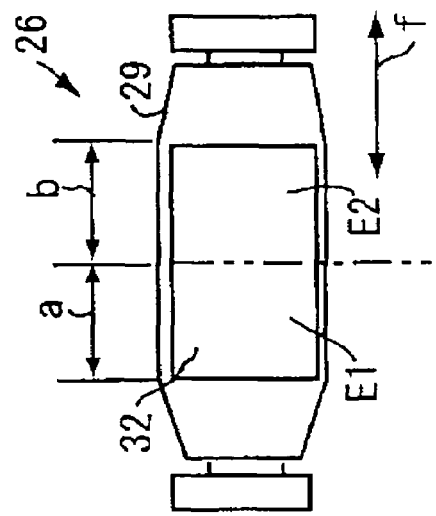

Although in the above described first embodiment, the exhaust emission purifying catalyst device 26 shown in FIGS. 1 and 2A is used which is constructed such that the supporting layers 33 of the single carrier 32 are formed of alkali metal composed mainly of potassium (K) in the exhaust passage upstream area a and are formed of alkali earth metal composed mainly of barium (Ba) in the exhaust passage downstream area b, an exhaust emission purifying catalyst device 26' in FIG. 2B may be used instead.

The exhaust emission purifying catalyst device 26' is provided with a carrier 32 configured as a single body, and barium (Ba) with a high HC purifying capability is supported on supporting layers 33 in both an exhaust passage upstream area a and an exhaust passage downstream area b of the carrier 32, and as is the case with the exhaust emission purifying catalyst device 26 in FIG. 2A, the supported amount of noble metal 34 is set to 3.0 g/L in the exhaust passage upstream area a and is set to 5.0 g/L in the exhaust passage downstream area b.

The exhaust emission purifying catalyst device 26' in FIG. 2B obtains substantially the same operational effects as the exhaust emission purifying catalyst device 26 in FIG. 2A. Specifically, when the air-fuel ratio is switched to a rich air-fuel ratio, the consumption of HC and CO (reducing agents) by noble metal in the exhaust passage upstream area a is suppressed, so that the remaining reducing agents can positively reduce $NO_x$ emitted from the $NO_x$ catalyst section E1 to thus improve the $NO_x$ purifying efficiency.

Although in the above described embodiments, in the exhaust emission purifying catalyst device 26, the amount of the noble metal 34 supported on the supporting layers 33 in the exhaust passage upstream area a of the carrier 32 is set to 3.0 g/L, and the amount of the noble metal 34 supported on the supporting layers 33 in the exhaust passage downstream area b of the carrier 32 is set to 5.0 g/L; i.e., the amount of the noble metal 34 is separately set in the exhaust passage upstream area a and the exhaust passage downstream area b, the present invention is not limited to this, but the supported amount of the noble metal 34 may be set to be gradually increased from the exhaust passage upstream end to the exhaust passage downstream end (gradation).

Although in the above described embodiments, the supporting layers 33 in the exhaust passage upstream area a of the single carrier 32 are formed of alkali metal composed mainly of potassium (K), and the supporting layers 33 in the exhaust passage downstream area b of the single carrier 32 are formed of alkali earth metal composed mainly of barium (Ba), the present invention is not limited to this, but potassium K and barium B may be supported in the whole area of the carrier 32 such that a higher percentage of potassium (K) (up to 100%) is supported at the exhaust passage upstream end and a higher percentage of barium (Ba) is supported at the exhaust passage downstream end, and the percentage of potassium (K) is gradually reduced and the percentage of potassium (K) is gradually raised from the exhaust passage upstream end to the exhaust passage downstream end (gradation).

Further, potassium (K) may be supported in the whole area of the carrier 32 such that a higher percentage of potassium (K) is supported at the exhaust passage upstream end, and the percentage of potassium (K) is gradually reduced from the exhaust passage upstream end to the exhaust passage downstream end (gradation).

Although in the above described embodiments, the purge pulse injection PP is performed in expansion strokes, the present invention is not limited to this, but the same effects as in the above described embodiments can be obtained if the air-fuel ratio is changed as below. Specifically, in the case where $NO_x$ purge is performed, if the air-fuel ratio in the rich pulse injection PH is controlled to such a value as to satisfactorily emit and reduce $NO_x$, and when the air-fuel ratio of exhaust gas is switched from a lean air-fuel ratio to an approximately stoichiometric air-fuel ratio, the degree of richness is increased so that the air-fuel ratio can be considerably higher than a stoichiometric air-fuel ratio, the same effects as in the above described embodiments can be obtained.

Further, although in the above described embodiments, a spark ignition type internal combustion engine which directly injects fuel into combustion chambers is used as an internal combustion engine to which the exhaust emission control apparatus is applied, the present invention may be applied to a diesel engine, or a spark ignition type lean burn engine which injects fuel into intake pipes and leads an air-fuel mixture into combustion chambers.

Although in the above described embodiments, the purge pulse injection PP is performed in expansion strokes, the present invention is not limited to this, but in an engine of the type that fuel is injected into intake pipes (intake passages), the same effects as in the above described embodiments can be obtained if the air-fuel ratio is changed as below. Specifically, in the case where $NO_x$ purge is performed in such an engine, if the air-fuel ratio in main injection is controlled to such a value as to satisfactorily emit and reduce $NO_x$, and when the air-fuel ratio of exhaust gas is switched from a lean air-fuel ratio to an approximately stoichiometric air-fuel ratio, the degree of richness is increased so that the air-fuel ratio can be considerably higher than a stoichiometric air-fuel ratio, the same effects as in the above described embodiments can be obtained.

Third Embodiment

A description will now be given of a third embodiment of the present invention with reference to FIGS. 9 and 10.

Figure 9:
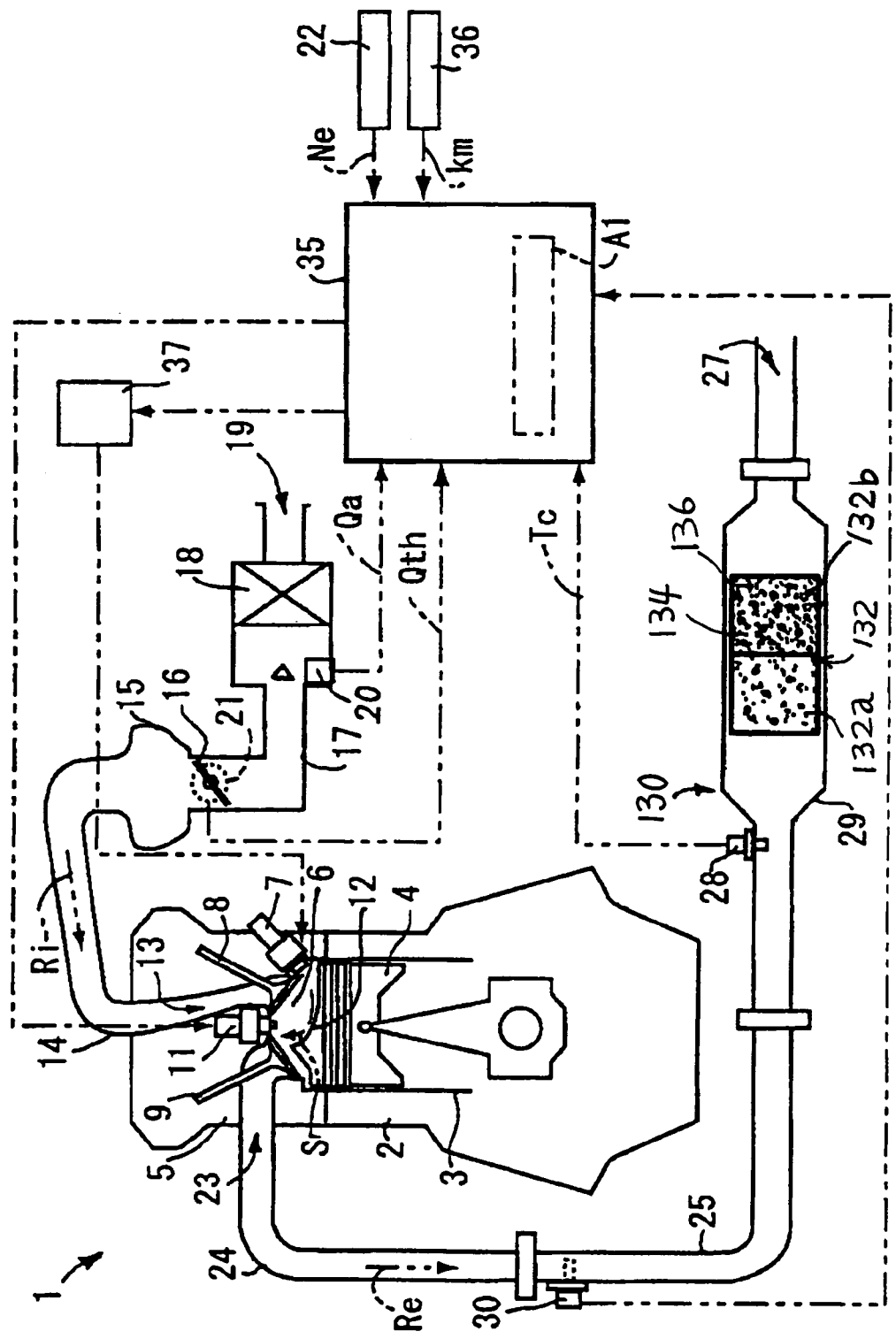
FIG. 9 is a view schematically showing the construction of an exhaust emission control apparatus including an exhaust purifying catalyst device according to a third embodiment of the present invention.

The third embodiment in FIGS. 9 differs from the above described first embodiment in that an exhaust emission purifying catalyst device ($NO_x$ occluding catalyst unit) 130 shown in FIG. 9 is used in place of the exhaust emission purifying catalyst device 26 shown in FIG. 1, and description of the same component parts is omitted. The exhaust emission purifying catalyst device 130 is constructed such that a carrier 132 is divided into an exhaust passage upstream area 132a and an exhaust passage downstream area 132b, and the supported amount of O2 storage agent 134 is set to be smaller in the exhaust passage upstream area 132a than in the exhaust passage upstream area 132b.

The $NO_x$ occluding catalyst unit 130 is comprised of the carrier 132 configured as a single body having a large number of through holes passed through the carrier 132, and supporting carriers made of fire-resistance inorganic oxide formed on inner surfaces which define the through holes. Any noble metal 136 selected from copper (Cu), cobalt (Co), silver (Ag), platinum (Pt), palladium (Pd), and rhodium (Rh) is supported as active noble metal on the supporting layers, and alkali metal (such as potassium (K) and sodium (Na)) and alkali earth metal (such as barium (Ba)) are supported as $NO_x$ occluding agents.

Therefore, the $NO_x$ occluding catalyst unit 130 basically has a $NO_x$ occluding catalyst function of occluding $NO_x$ when the air-fuel ratio of exhaust gas is lean and in an oxygen-excess atmosphere in which the oxygen concentration is high, and emitting the occluded $NO_x$ when the air-fuel ratio of exhaust gas is rich and in an oxygen concentration reduced atmosphere in which the oxygen concentration is low, to thus reduce and remove the $NO_x$ by catalytic action of the noble metal 136.

The $NO_x$ occluding catalyst unit 130 also has a function of a three-way catalyst function since the above-mentioned noble metal 136 is supported on the supporting layers.

Thus, the $NO_x$ occluding catalyst unit 130 can satisfactorily purify HC and CO as well as $NO_x$ when the air-fuel ratio of exhaust is stoichiometric or rich.

The $NO_x$ occluding catalyst unit 130 also has an O2 storage function (oxygen occluding function; also called "OSC"); an O2 storage agent (oxygen occluding agent; OSC agent) such as cerium (Ce) is supported on the supporting layers. Specifically, the $NO_x$ occluding catalyst unit 130 has a function of occluding O2 (oxygen) when the air-fuel ratio of exhaust gas is lean and in an oxygen-excess atmosphere, and emitting the occluded O2 when the air-fuel ratio of exhaust gas is rich and in an oxygen concentration reduced atmosphere.

Therefore, in the case where the target air-fuel ratio of exhaust gas is stoichiometric or rich and, for example, the above-mentioned O2 sensor 30 provides O2 feedback control, even if the air-fuel ratio of exhaust gas is changed to be lean or rich, the change is adjusted by O2 occluded by the O2 storage agent 134, and thus the $NO_x$ occluding catalyst unit 130 can maintain the catalyst atmosphere at an approximately stoichiometric air-fuel ratio. It is therefore possible to fulfill the three-way catalyst function.

In further detail, as schematically shown in FIG. 9, the supported amount of the O2 storage agent (indicated by dots) 134 is set to be smaller in the exhaust passage upstream area 132a than in the exhaust passage downstream area 132b in the carrier 132. Namely, in the $NO_x$ occluding catalyst unit 130, the amount of the O2 storage agent 134 is set to be smaller in the exhaust passage upstream area 132a than in the exhaust passage downstream area 132b.

Further, it has been proved that the O2 storage agent 134 is capable of occluding O2 due to the presence of the noble metal 136, and here, as schematically shown in FIG. 9, the supported amount of the noble metal (indicated by small circles) 136 is set to be smaller in the exhaust passage upstream area 132a than in the exhaust passage downstream area 132b in the carrier 132 according to the supported amount of the O2 storage agent 134.

A description will now be given of the operation of the exhaust emission control apparatus constructed as described above and the operation of the exhaust emission catalyst device according to the present embodiment.

For example, when the $NO_x$ emitting means 32 determines that the amount of $NO_x$ occluded to the $NO_x$ occluding catalyst unit 130 has reached a predetermined amount, the fuel injection mode is switched to a $NO_x$ purge mode, and the air-fuel ratio of exhaust gas is made rich, and the catalyst atmosphere is changed to the above-mentioned atmosphere in which the oxygen concentration is low. As a result, reducing agents such as CO and HC are discharged into exhaust passages to start $NO_x$ purge.

On this occasion, as described above, the O2 storage agent 134 is supported on the $NO_x$ occluding catalyst unit 130, such that the supported amount of the O2 storage agent 134 is set to be smaller in the exhaust passage upstream area 132a than in the exhaust passage downstream area 132b in the carrier 132.

Therefore, since the amount of the O2 storage agent 134 is smaller in the exhaust passage upstream area 132a than in the exhaust passage downstream area 132b, reducing agents such as CO and HC can be prevented from being entirely consumed in the exhaust passage upstream area 132a due to oxidative reaction with O2 occluded to the O2 storage agent 134, even if $NO_x$ purge is carried out.

As a result, the $NO_x$ occluded to the exhaust passage upstream area 132a can be emitted and reduced, and reducing agents such as CO and HC can surely reach the exhaust passage downstream area 132b. Thus, the $NO_x$ occluded to the exhaust passage downstream area 132b can be satisfactorily emitted and reduced without the necessity of increasing fuel so as to increase reducing agents such as CO and HC.

Also, in a situation where the amount of O2 is excessive, the O2 covers the noble metal 136 to degrade the activity thereof (oxygen poisoning), but if reducing agents such as CO and HC can surely reach the exhaust passage downstream area 132b during $NO_x$ purge, the O2 which covers the noble metal 136 can be surely reduced by the reducing agents not only in the exhaust passage upstream area 132a but also in the exhaust passage downstream area 132b. This makes it possible to satisfactorily restore the activity of the noble metal 136.

As described above, the exhaust emission purifying catalyst device according to the present embodiment is capable of efficiently restoring the $NO_x$ occluding capability of the $NO_x$ occluding catalyst unit 130 as a whole and the activity of the noble metal 136 in a short period of $NO_x$ purge time and without deteriorating fuel economy, and thus improving the exhaust emission purifying efficiency.

Figure 10:
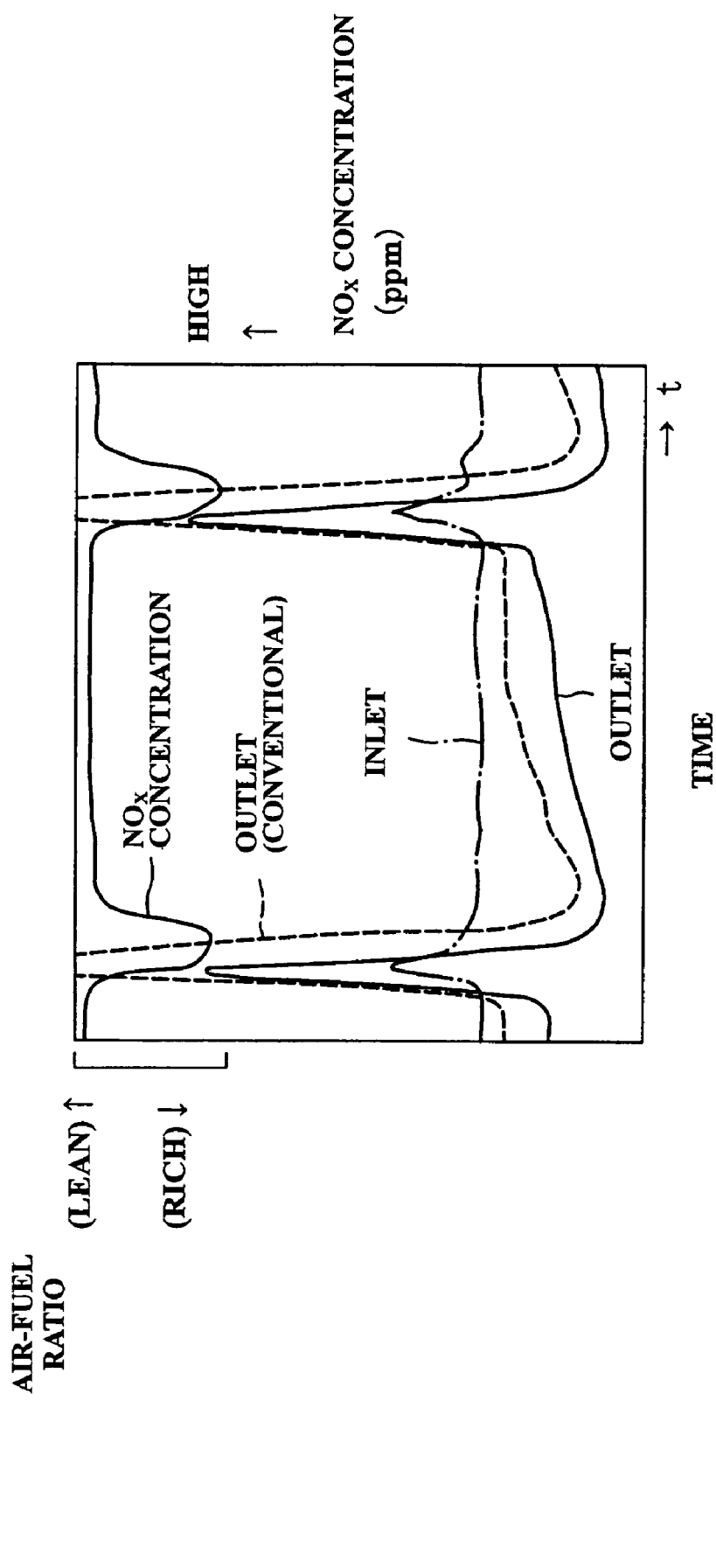
FIG. 10 is a diagram showing experimental results in the case where the exhaust emission control apparatus according to the third embodiment is used.

Specifically, FIG. 10 shows an experimental result after $NO_x$ purge as the outlet $NO_x$ concentration of the $NO_x$ occluding catalyst unit 130 in the case where the exhaust emission purifying catalyst device according to the present embodiment, and according to this experimental result, if the supported amount of the O2 storage agent 134 is set to be smaller in the exhaust passage upstream area 132a than in the exhaust passage downstream area 132b in the carrier 132 (as indicated by a solid line), it is possible to satisfactorily restore the $NO_x$ occluding capability and improve the $NO_x$ purifying efficiency and the exhaust emission purifying efficiency as compared with the prior art in which a uniform amount of O2 storage agent 134 is supported (as indicated by a broken line). It should be noted that FIG. 10 also shows the air-fuel ratio during $NO_x$ purge and the inlet $NO_x$ concentration of the $NO_x$ occluding catalyst unit 130 (a chain line).

Also, in the present embodiment, since the supported amount of the noble metal 136 is set to be smaller in the exhaust passage upstream area 132a than in the exhaust passage downstream area 132b in the carrier 132 according to the supported amount of the O2 storage agent 134, neither too much nor too little noble metal 136 which is relatively expensive can be effectively supported on the $NO_x$ occluding catalyst unit 130.

However, the supported amount of the noble metal 136 should not necessarily be changed, but a uniform amount of the noble metal 136 may be supported on the carrier 132.

Fourth Embodiment

A description will now be given of a fourth embodiment of the present invention with reference to FIG. 11.

Figure 11:
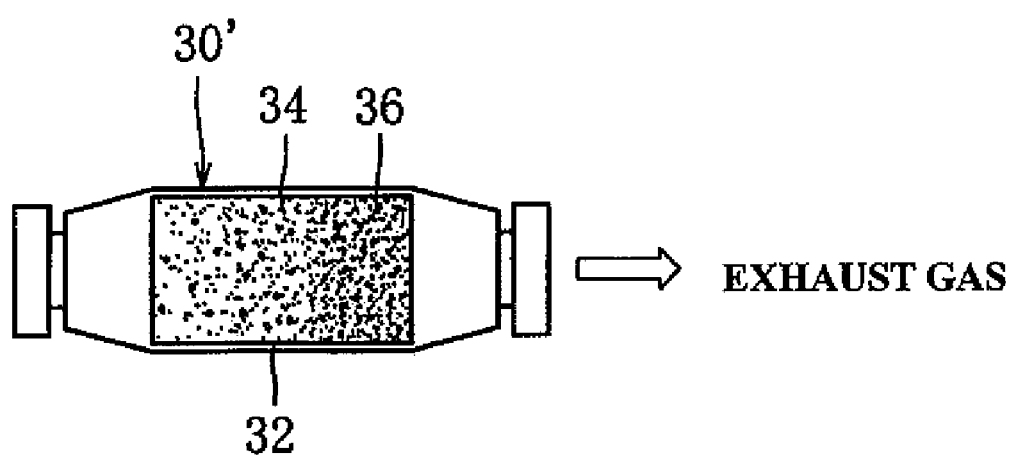
FIG. 11 is a view showing a fourth embodiment of the present invention.
Figure 12B:
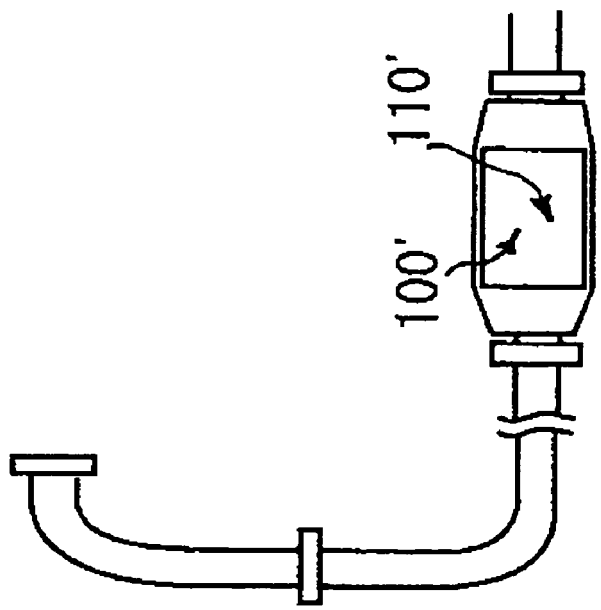
Figure 12A:
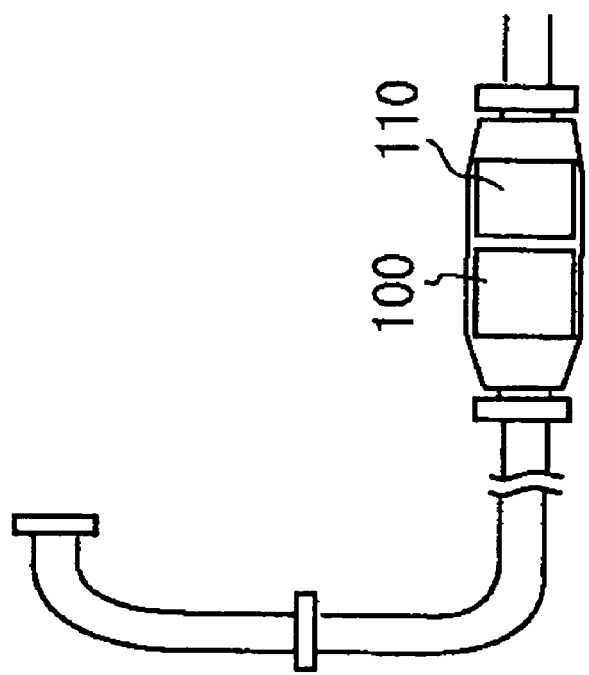

In the above described third embodiment, the carrier 132 is divided into the exhaust passage upstream area 132a and the exhaust passage downstream area 132b, in which different amounts of the O2 storage agent 134 are supported, but in the fourth embodiment, as shown in FIG. 11, a $NO_x$ occluding catalyst unit 130' is used which is configured such that the supported amount of the O2 storage agent 134 is gradually increased (gradation) from the exhaust passage upstream area 132a to the exhaust passage downstream area 132b.

Therefore, according to the present embodiment, it is possible to restore the NOX occluding capability of the $NO_x$ occluding catalyst unit 130' as a whole and the activity of the noble metal 136 in a more efficient manner.

Also, as shown in FIG. 11, the supported amount of the noble metal 136 may be gradually increased (gradation) from the exhaust passage upstream area 132a to the exhaust passage downstream area 132b.

The invention claimed is:

1. An exhaust emission purifying catalyst device, comprising:
   a single carrier that is disposed in an exhaust passage and includes a large number of through holes extending through said single carrier in a flowing direction of exhaust gasses; and
   supporting layers made of fire-resistant inorganic oxide and formed on inner surfaces defining the through holes;
   wherein said supporting layers support noble metal and NOx trapping agents for occluding NOx in exhaust gas when an exhaust air-fuel ratio is lean, and the exhaust emission purifying catalyst device emits and reduces the occluded NOx when an exhaust air-fuel ratio is stoichiometric or rich, and the amount of the noble metal supported on said supporting layers is set to be smaller in an exhaust passage upstream area of said carrier than in an exhaust passage downstream area of said carrier, and
   wherein the supporting layers are composed mainly of potassium in the exhaust passage upstream area and are composed mainly of barium in the exhaust passage downstream area.

2. The exhaust emission purifying catalyst device according to claim 1, wherein the amount of the supported noble metal is set to be gradually increased from the exhaust passage upstream area of said carrier to the exhaust passage downstream area of said carrier.

3. The exhaust emission purifying catalyst device according to claim 1, wherein:
   said supporting layers support an oxygen occluding agent; and
   the amount of the supported oxygen occluding agent is set to be smaller in the exhaust passage upstream area of said carrier than in the exhaust passage downstream area of said carrier.

4. The exhaust emission purifying catalyst device according to claim 3, wherein the amount of the supported oxygen occluding agent is set to be gradually increased from the exhaust passage upstream area of said carrier to the exhaust passage downstream area of said carrier.

5. The exhaust emission purifying catalyst device according to claim 3, wherein the amount of the supported noble metal is set to be smaller in the exhaust passage upstream area of said carrier than in the exhaust passage downstream area of said carrier according to the amount of the supported oxygen occluding agent.

6. The exhaust emission purifying catalyst device according to claim 5, wherein the amount of the supported oxygen occluding metal is set to be gradually increased from the exhaust passage upstream area of said carrier to the exhaust passage downstream area of said carrier.

* * * * *